(12) United States Patent
Sato et al.

(10) Patent No.: US 6,283,446 B1
(45) Date of Patent: Sep. 4, 2001

(54) GATE VALVE SYSTEM

(75) Inventors: Toshiyuki Sato; Tamotsu Yamashita; Hiroshi Fujisaki, all of Osaka; Yasuhiko Ito, Kagamihara; Koichi Nishigaki, Gifu, all of (JP)

(73) Assignee: Suiken Technology Co., Ltd. (JP)

( * ) Notice: Subject to any disclaimer, the term of this patent is extended or adjusted under 35 U.S.C. 154(b) by 0 days.

(21) Appl. No.: 09/520,309

(22) Filed: Mar. 7, 2000

(30) Foreign Application Priority Data

Mar. 18, 1999 (JP) .................................................. 11-073892
May 18, 1999 (JP) .................................................. 11-137217

(51) Int. Cl.[7] .................................................. F16K 27/00
(52) U.S. Cl. .......................................... 251/193; 251/326
(58) Field of Search ..................................... 251/326, 327, 251/328, 329, 193, 194, 195, 196, 197, 198, 199, 200, 201, 202, 203, 204

(56) References Cited

U.S. PATENT DOCUMENTS

| 3,128,078 | * | 4/1964 | Kosik | 251/329 X |
| 3,316,929 | * | 5/1967 | Millette | 251/326 X |
| 3,662,778 | * | 5/1972 | Leopold, Jr. | 251/326 X |
| 3,746,304 | * | 7/1973 | Matthias | 251/327 |
| 3,931,953 | * | 1/1976 | Allen | 251/196 X |
| 3,957,245 | * | 5/1976 | Daghe | 251/326 X |
| 3,963,214 | * | 6/1976 | Hackman et al. | 251/328 X |
| 3,993,092 | * | 11/1976 | Still | 251/328 X |
| 4,162,058 | * | 7/1979 | Ellis | 251/326 |
| 4,541,613 | * | 9/1985 | Barbe | 251/326 |
| 4,629,160 | * | 12/1986 | David | 251/326 X |
| 5,439,024 | * | 8/1995 | Zimmerly | 251/327 X |

FOREIGN PATENT DOCUMENTS

406159527-A * 6/1994 (JP) ..................................... 251/326

* cited by examiner

*Primary Examiner*—Kevin Shaver
*Assistant Examiner*—John Bastianelli
(74) *Attorney, Agent, or Firm*—Fulbright & Jaworski L.L.P.

(57) ABSTRACT

The present invention provides an improved gate valve system for cutting off a fluid flowing through a pipe. The gate valve system includes a gate valve and at least one member. The gate valve includes a seal member exhibiting an elastically deformable property for sealingly contacting the inner surface of the pipe, and a support member for receiving said seal member and movable in the perpendicular direction to the flowing direction of the fluid between the outside and inside of the pipe for timely bringing said seal member into a sealing contact with the inner surface of the pipe. The at least one expansion member is deformable, but is not substantially subjected to the volume variation even under pressure. The at least one expansion member is embedded in the seal member in such a manner as to expand the seal member laterally outwardly to the inner surface of the pipe upon receiving pressure effected by the sealing contact between the seal member and the inner surface of the pipe.

4 Claims, 20 Drawing Sheets

GATE VALVE SYSTEM

BACKGROUND OF THE INVENTION

1. Field of the Invention

The present invention relates to a gate valve system that is capable of cutting an existing pipe with water flowing therethrough or the like therein without cutting off the water.

2. Discussion of the Background

In the following description, the terms, "lateral", "vertical" and "downward", as well as "downwardly", "laterally" and "vertically", or other terms indicating the directions, used herein are meant to indicate those directions as viewed in a front view as shown in FIG. 22, and based upon the longitudinal axis of the gate valve system installed on the existing pipe.

A well known method of cutting an existing pipe with water flowing therethrough includes boring the wall of an existing pipe without cutting off the water therein during forming a through-hole, and placing a gate valve into the pipe through the through-hole formed in the wall of the pipe. It is desirable to form the through-hole as smaller as possible, specifically the through-hole of a diameter smaller than the diameter of the pipe.

To form the through-hole of such a smaller diameter, the gate valve needs to be of such a construction as to be placed into the inside of the pipe via the through-hole having a diameter small than the diameter of the pipe, as well as to be capable of hermetically sealing the inside of the pipe for cutting off the water flowing therethrough. To accomplish these requirements, the gate valve includes a support member 61, and a seal member 63 supported on the support member 61, which exhibits an elastically deformable property for sealing the existing pipe 62.

The gate valve of the above type accomplishes the water cutting-off by forcing the support member 61 into the existing pipe having a circular cross section via the through hole of a diameter smaller than the diameter of the existing pipe 62 to allow the seal member 63 to hermetically contact the inner surface of the existing pipe 62.

However, the curved surface of the pipe may hesitate the seal member 63 from sufficiently expanding towards lateral sides of the pipe, and therefore pose a problem that a part of the peripheral edge portion of the seal member 63 cannot reach the inner surface of the pipe 62, and therefore a hermetic contact of the seal member 63 against the pipe 62 is hardly accomplished, which leads to a poor water tightness. To overcome this problem, some types of members for laterally expanding the seal member 63 were developed.

The means for laterally expanding the seal member 63 has such a construction that a plurality of seal expanding members are arranged inside of the support member 61 to mechanically expand the seal member 63. This may need a complicated structure and a relatively large size of the gate valve, which are disadvantageous for the existing pipe of a smaller diameter, and which also increase the manufacturing costs.

The present invention has been conceived in consideration of the above problem. It is an object of the present invention to provide a gate valve system that is of a simple construction and a smaller size.

It is another object of the present invention to provide a gate valve system that is capable of sufficiently cutting off the water flowing through the existing pipe.

It is still another object of the present invention to provide a gate valve system that can be manufactured in a cheap manner.

SUMMARY OF THE INVENTION

In accordance with the present invention, there is provided a gate valve system for cutting off a fluid flowing through a pipe. The gate valve system includes a gate valve and at least one member. The gate valve includes a seal member exhibiting an elastically deformable property for sealingly contacting the inner surface of the pipe, and a support member for receiving said seal member and movable in the perpendicular direction to the flowing direction of the fluid between the outside and inside of the pipe for timely bringing said seal member into a sealing contact with the inner surface of the pipe. The at least one expansion member is deformable, but is not substantially subjected to the volume variation even under pressure. The at least one expansion member is embedded in the seal member in such a manner as to expand the seal member laterally outwardly to the inner surface of the pipe upon receiving pressure effected by the sealing contact between the seal member and the inner surface of the pipe.

In the gate valve system of the above arrangement, the at least one expansion member embedded in the seal member can forcibly expand the seal member laterally outwardly to the inner surface of the pipe against the elastic force of the seal member upon receiving the pressure effected by the contact between the seal member and the inner surface of the pipe. This arrangement can simplify the structure of the gate valve system and reduce the dimension of the same, while accomplishing sufficient water tightness even for the pipe of a smaller diameter. Furthermore, the gate valve system of the present invention can be manufactured at low costs.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
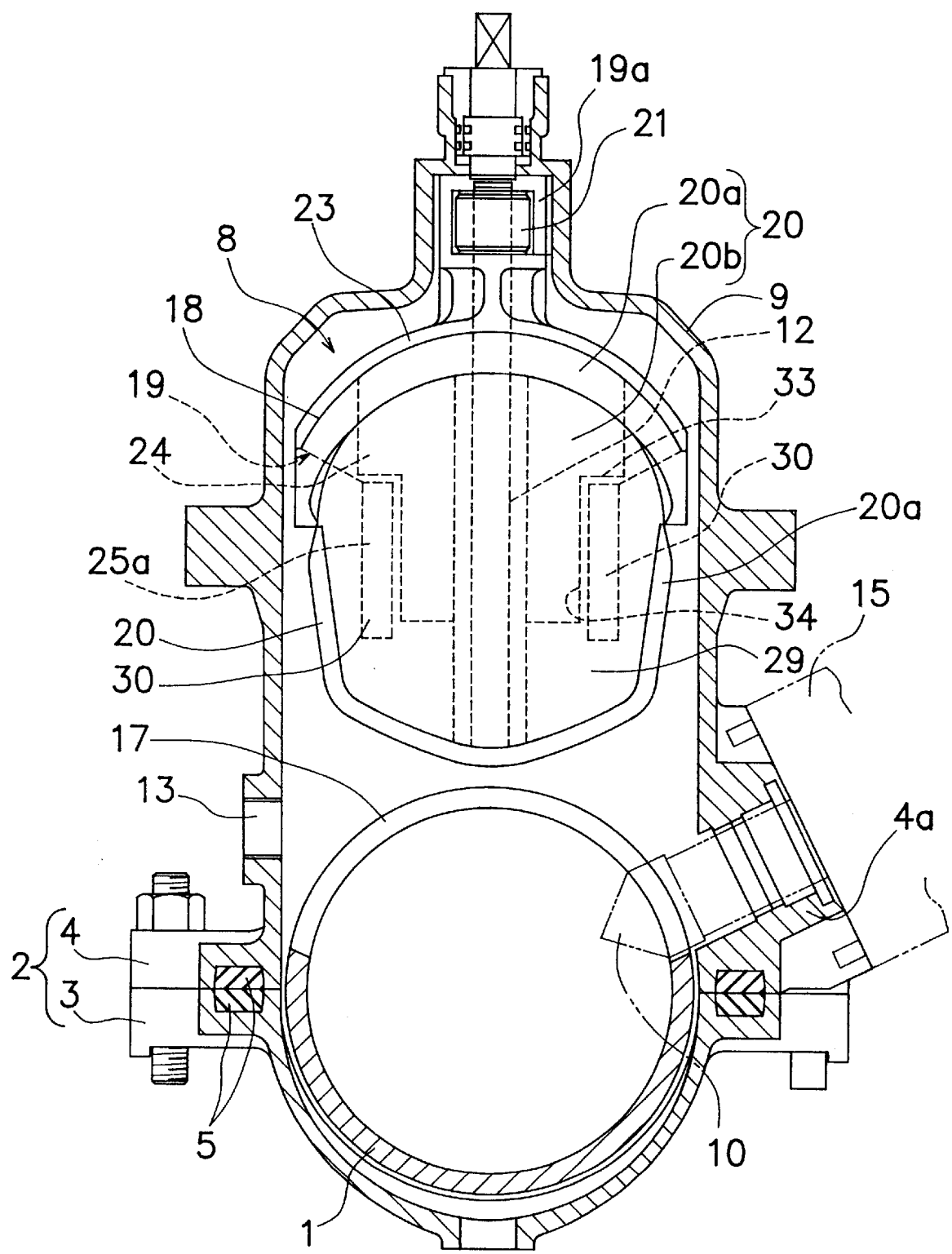
FIG. 1 is a cross sectional front view of a gate valve system in accordance with a first embodiment of the present invention.
Figure 2:
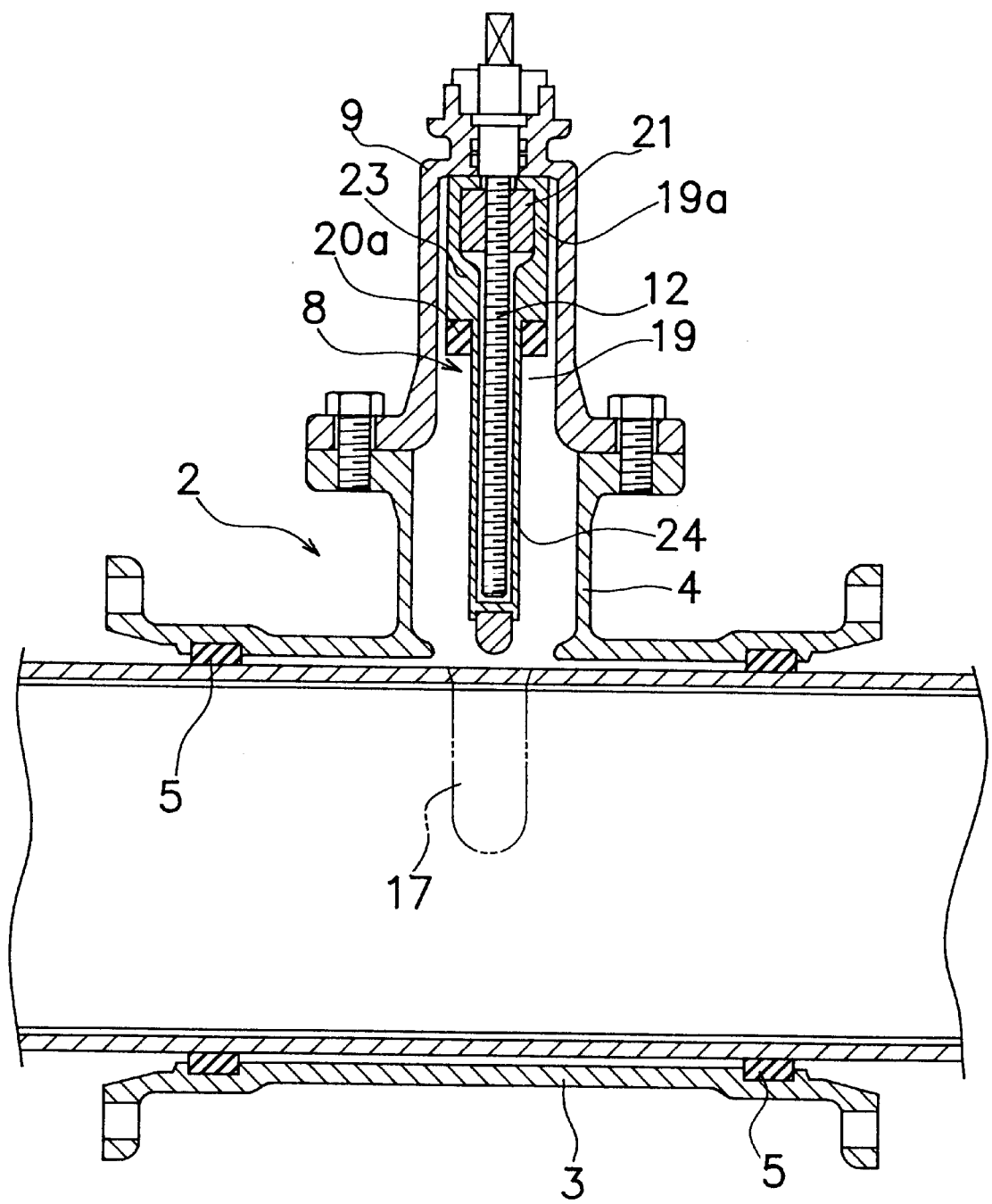
FIG. 2 is a cross sectional side view of the gate valve system of FIG. 2.

A first embodiment of a gate valve system according to the present invention will be hereinafter described with reference to the accompanying drawings. As illustrated in FIGS. 1 and 2, a sealing case 2 includes first and second halves 3, 4, which are coupled together via a fastening member such as a bolt and a nut with a rubber packing 5 placed between abutting surfaces of the first and second halves 3, 4. The sealing case 2 also includes a cover 9 mounted on the second half 4. A gate valve system 8 is previously placed inside of the sealing case 2.

The second half 4 is provided with a branch portion 4a protruding therefrom, through which a cutter portion 10 of a cutting device 15 is placed into a sealing chamber defined by the sealing case 2. The second half 4 also defines an outlet port 13 with a discharge valve (not shown), through which water is discharged to the outside together with cut chips as a result of cutting the wall of an existing pipe 1.

The branch portion 4a carries a closing valve (ball valve), and the cutting device 15 for forming a cut out 17 in the wall of the pipe. Specifically, the cutting device 15 moves radially inwardly the cutter portion 10 towards the existing pipe 1, and rotates via the driving force of the driving mechanism such as an engine or electric motor (not shown) for cutting the wall of the pipe 1. The cutting device 15 is of a similar construction to a boring machine of a hole saw type used for the existing pipe with the water flowing therethrough, and therefore will not be herein discussed or illustrated in detail.

The gate valve system 8 will be hereinafter described in detail. The gate valve system 8 is disposed above an object surface of the existing pipe to be cut by the cutting device 15. The gate valve system 8 includes a gate valve 19 which in turn includes a support member 18 made of metal or other hard materials and provided at an upper portion thereof with a nut receiving portion 19a, and a seal member 20 made of a rubber material exhibiting an elastically deformable property. A spindle 12 has a first end portion with an outwardly threaded portion formed thereon and a second end portion coupled to a seal member 20, which will be described hereinafter. The spindle 12 is threadably engaged at the first end portion thereof with a nut 21 received in the nut receiving portion 19a for being rotatably supported by the cover 9. The rotation of the spindle 12 by the rotational force of the driving mechanism causes the support member 8 to vertically move within the sealing case 2.

Figure 3:
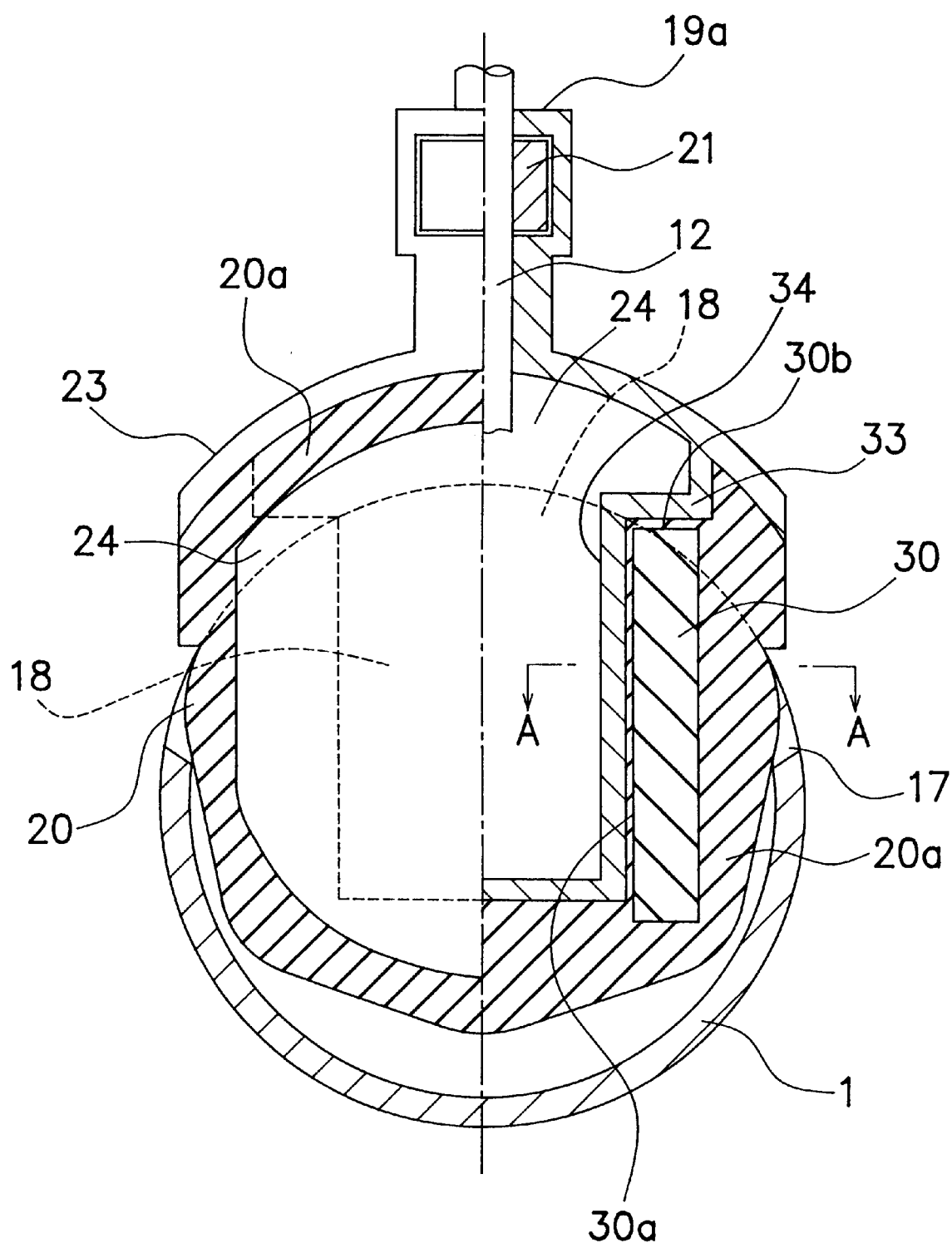
FIG. 3 is a cross sectional view showing a gate valve just before entering into the existing pipe.
Figure 4:
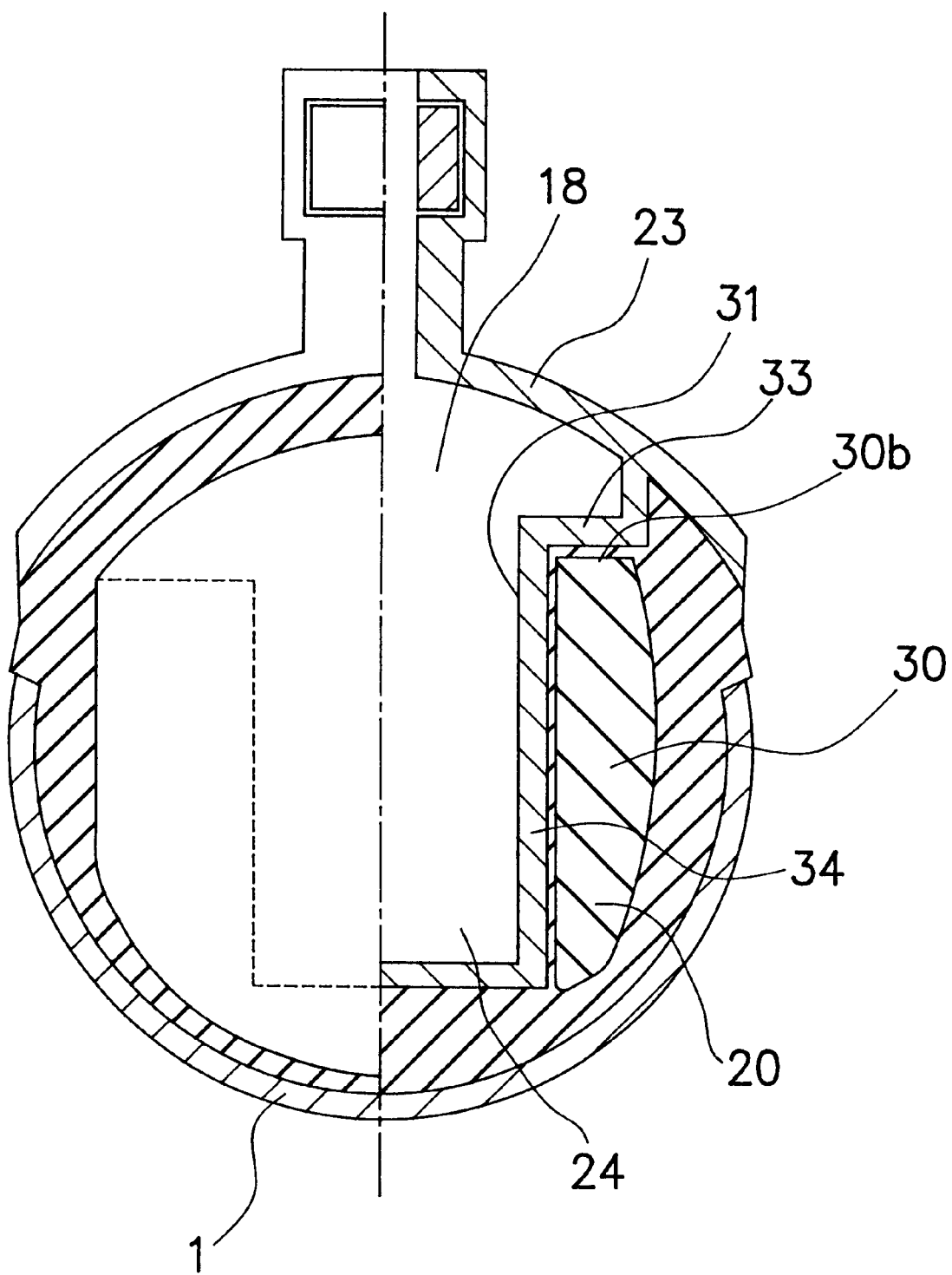
FIG. 4 is a cross sectional view showing the gate valve placed inside of the existing valve.
Figure 5:
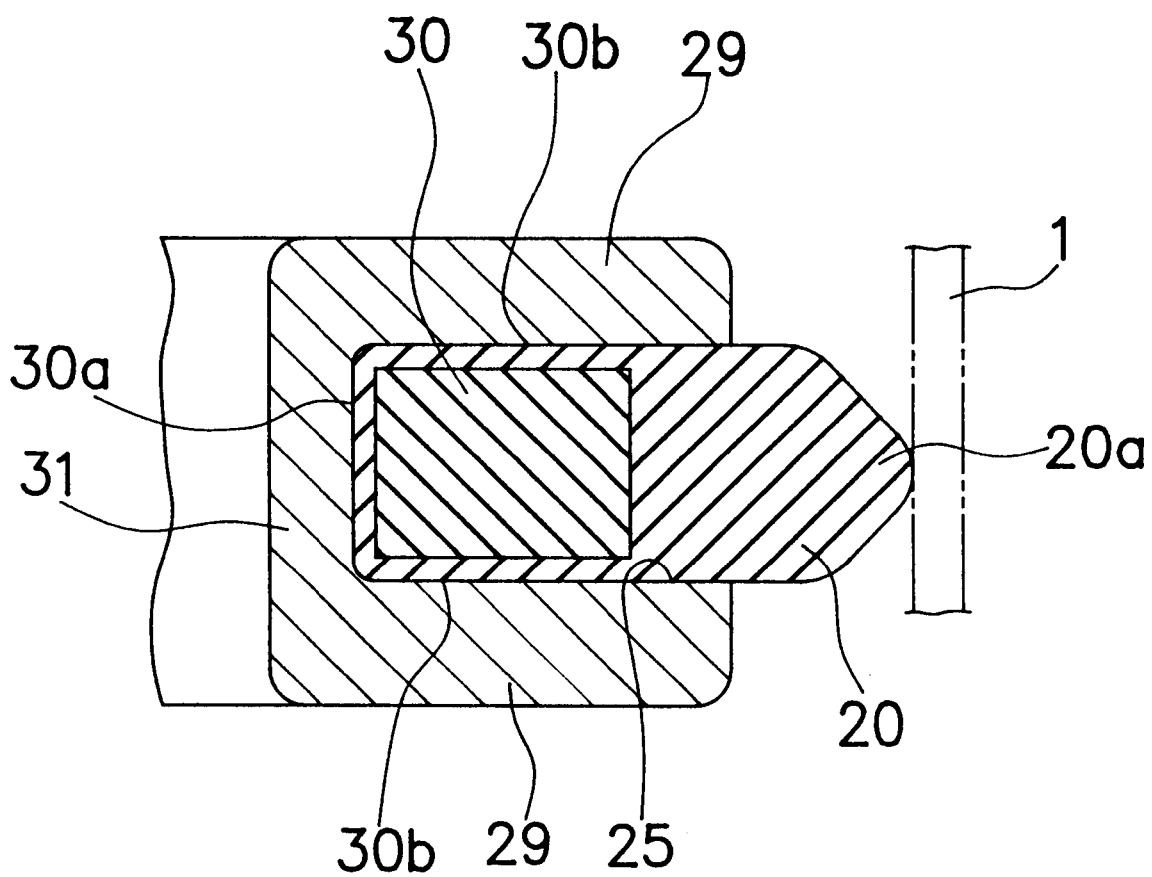
FIG. 5 is a cross sectional view of the gate valve taken along a line A—A in FIG. 3.
Figure 6:
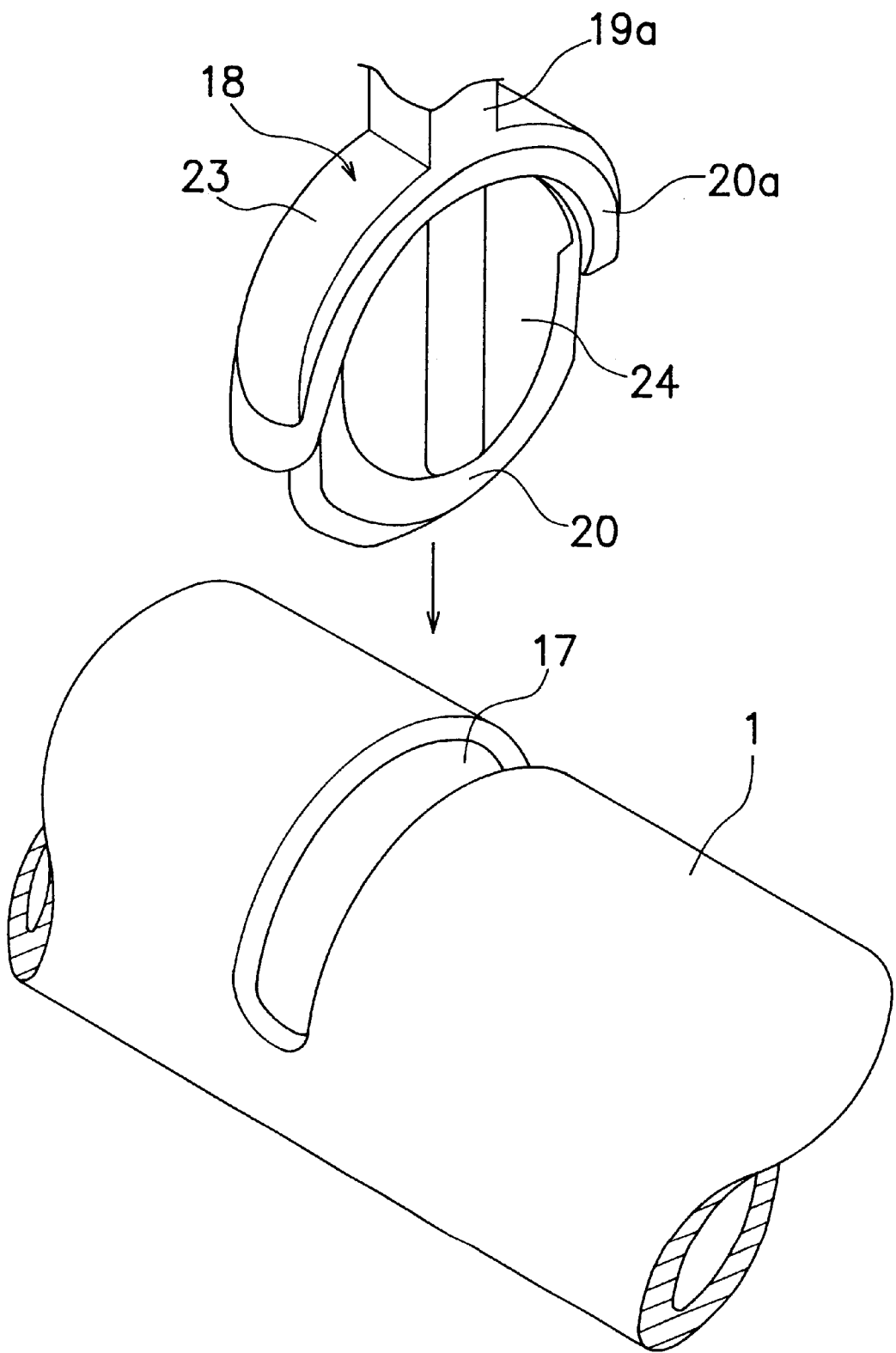
FIG. 6 is a perspective view illustrating the gate valve and the existing pipe.
Figure 7:
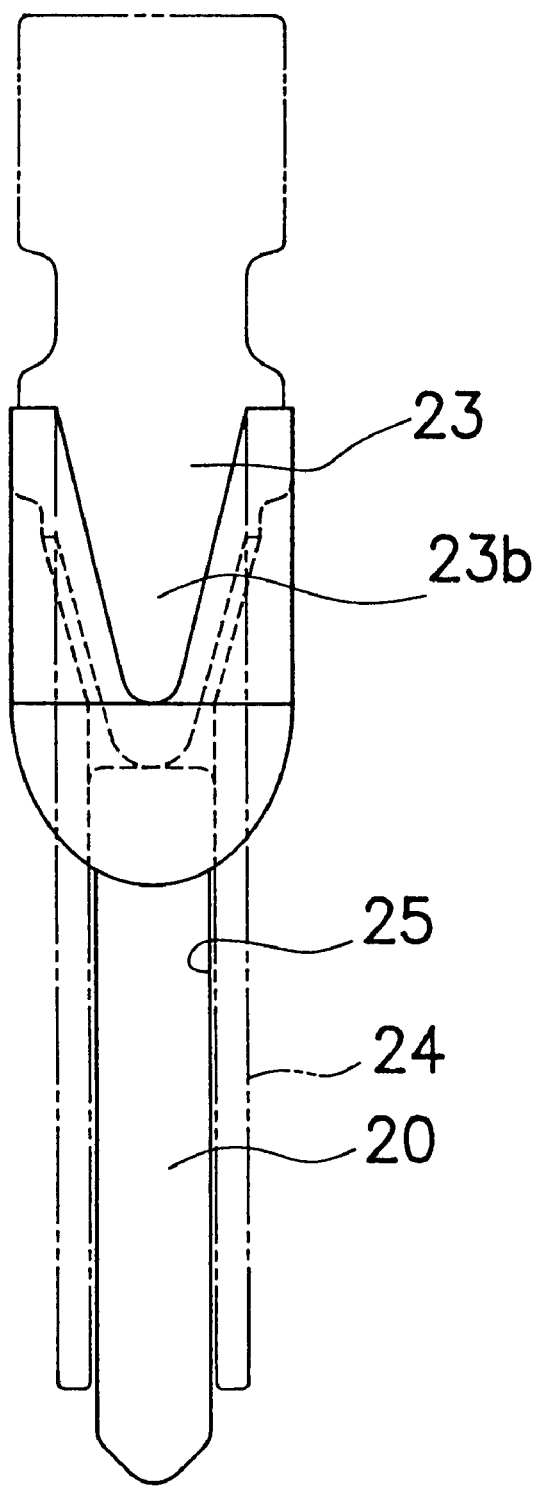
FIG. 7 is a side view of a seal member in accordance with the present invention.

The support member 18 includes a flange portion 23 having an arcuate shape as viewed from the front side and a retaining member 24 extending downwardly from the flange portion 23. The retaining member 24 has a peripheral edge forming a fitting groove 25 having a U-shaped cross section for receiving the seal member 20. More specifically, a pair of clamping walls 29 extend from the retaining member 24 to form the fitting groove 25 with a groove bottom 31 (FIG. 5). The groove bottom 31 has pressing portions 33 extending horizontally and supporting portions 34 downwardly extending from the corresponding pressing portions 33 (FIG. 3). The seal member 20 has an outer seal extension 20a and an inner seal extension 20b whose peripheral edge is fitted into the fitting groove 31. Both seal extensions 20a and 20b are preferably integrally made of the same material as one piece.

Embedded in the inner seal extension 20b of the seal member 20 are expansion members 30 made of, for example, a rubber material such as a silicon rubber and a plastic material, those of which are softer than the seal member 20 in such a manner as to be deformable upon receiving pressure, but are not substantially subjected to the volume variation even under pressure, for laterally expanding the inner seal extension 20b. The expansion members 30 thus made are disposed in both lateral sides of the inner seal extension 20b, each having an inward side 30a positioned closer to or in contact with the corresponding pressing portion 33 and an upper side 30b positioned closer to or in contact with the corresponding supporting portion 34 of the groove bottom 31 of the inner seal extension 20b.

The outer seal extension 20a of the seal member 20 defines an opening 23b extending along a longitudinal axis thereof for allowing the retaining member 24 of the gate valve 18 to pass therethrough from above and receive the inner seal extension 20b via the fitting groove 25. Under this state, the outer seal extension 20a is positioned below the flange portion 23 with or without contact thereto.

The operational steps of the gate valve system 8 will be now described.

An operator first installs the sealing case 2 on the existing pipe 1 with the water flowing therethrough by hermetically coupling the first and second halves 3, 4 via the fastening member to provide a hermetically sealed chamber within the sealing case 2. The sealing case 2 is then rotated around the axis of the existing pipe 1 to bring the cutter portion 10 to a starting point from which the cutter portion 10 cuts the wall of the existing pipe 1. The cutter portion 10 is then actuated and radially inwardly moved towards the existing pipe 1 to cut the wall of the pipe from the starting point. The sealing case 2 is then rotated around the axis of the existing pipe 1 by approximately 150 to 160 degrees, so that the cutter portion 10 cuts the wall of the pipe 1 from the start point to a terminal point to form the cut out 17 in an upper portion of the wall of the pipe 1. The chips as a result of cutting the wall of the pipe 1 are discharged from the outlet port 13 together with the water flowing through the outlet port 13 under pressure.

The outlet port 13 is closed with a plug (not shown) after forming the cut out 17. The cutter portion 10 is then retracted from the existing pipe 1 and the closing valve (ball valve) is closed. Subsequent to closing the outlet port 13, the cutting device 15 is removed from the sealing case 2. The sealing case 2 is then rotated to the initial position so as to locate the gate valve 19 above the cut out 17.

The gate valve 19 is then lowered and moved into the inside of the existing pipe through the cut out 17 by rotating the spindle 12 in a threaded engagement with the nut 21, thereby bringing the inner seal extension 20b into a contact engagement with a lower portion of the inner surface of the pipe. The inner seal extension 20b lying on the surface of the bottom portion of the pipe 1 is further pressed against the inner surface via the downward movement of the gate valve 19. The inner seal extension 20b continuously expands by this pressure, as sliding along the clamping walls 29. This expansion of the inner seal extension 20b tends to move the expansion members 30 embedded therein upwardly. However, the pressing portions 33 and the supporting portions 34 of the retaining member 24 together block the upward movement of the expansion members 30 via the abutment against the inward sides 30a and the upper sides 30b of the expansion members 30, so that both lateral portions of the inner seal extension 20b are forcibly expanded towards the lateral sides of the pipe 1 against the elastic force of the inner seal extension 20b. As a result, the inner seal extension 20b is pressed against the inner surface of the pipe throughout the peripheral edge of the inner seal extension 20b.

Since the expansion members 30 are not subjected to the volume variation, portions of the expansion members 30 which are pressed from below are moved to the lateral sides of the inner seal extension. As a result, the expansion members 30 allow the inner seal extension 20b of the seal member 20 to sealingly contact the inner surface of the pipe with a relatively large pushing force. At the same time, the outer seal extension 20a in an operative position of the gate valve system sealingly contact the peripheral portion of the cut out 17 from above for preventing the leakage of the water from the pipe 1.

To open the gate valve 19 placed in a closing state, the spindle 12 is reversely rotated to allow the inner seal extension 20b to be retracted from the sealing position. Since the seal member 20 has a self-restoring force which enables the compressed seal member 20 to regain its original shape, and the expansion members 30 smoothly follow the change in shape of the inner seal member 20, the gate valve system can easily return to its original shape.

Figure 8:
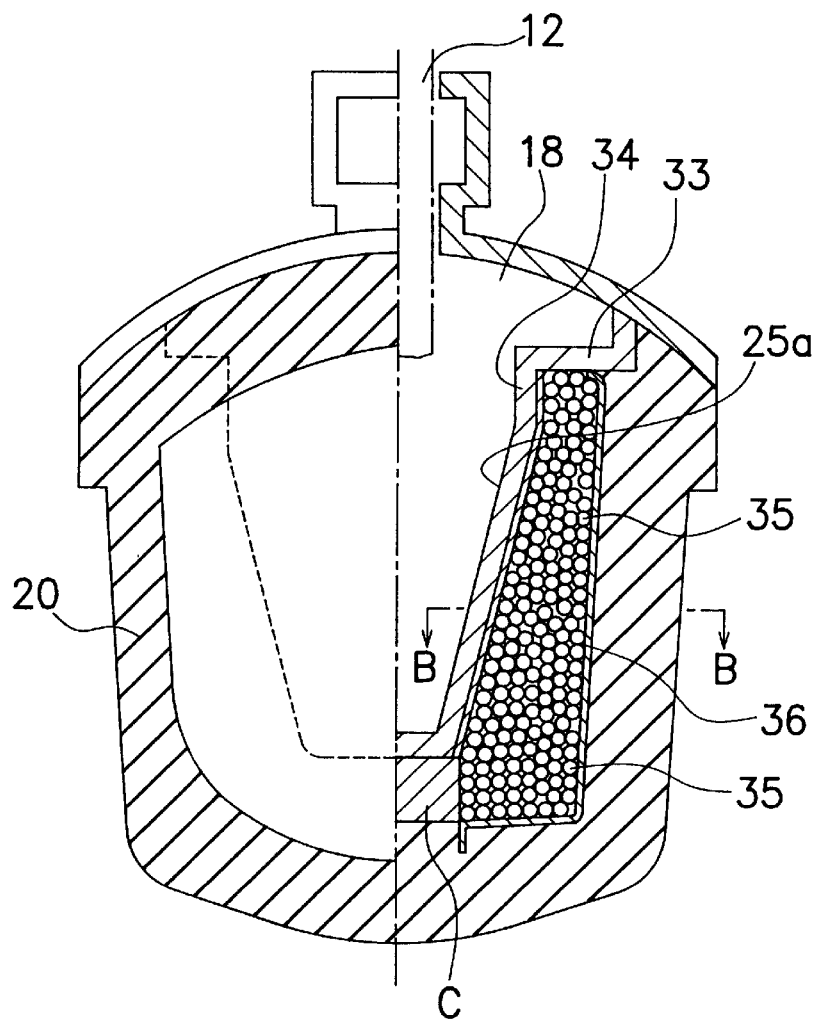
FIG. 8 is a partially cross sectional view of a gate valve in accordance with a second embodiment of the present invention.
Figure 9:
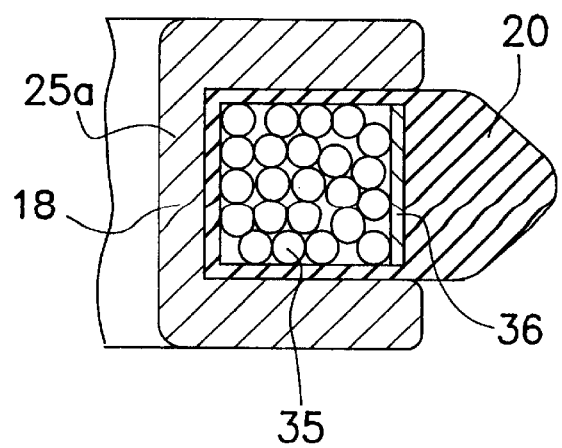
FIG. 9 is a cross sectional view of the seal member taken along a line B—B in FIG.8.

FIGS. 8 and 9 illustrate a second embodiment of the present invention, in which corresponding or identical parts to those of the first embodiment have been given the same reference characters to omit a detailed description thereof.

The expansion members 30 each includes balls (hardballs) 35 disposed around the supporting portions 34 and a flat spring 36 extending in each lateral side of the inner seal extension 20b from the pressing portion 33 to the lower portion thereof to surround the hardballs 35 in cooperation with the supporting portions 34 of the groove bottom 31. The expansion members 30 made of the hardballs 35 and the flat springs 36 are also embedded in the inner seal extension 20b in the same manner as the first embodiment. The supporting portions 34 of the groove bottom 31 respectively form slanting portions 25a which inwardly downwardly slant to form the retaining member 24 of a tapered shape.

Figure 10:
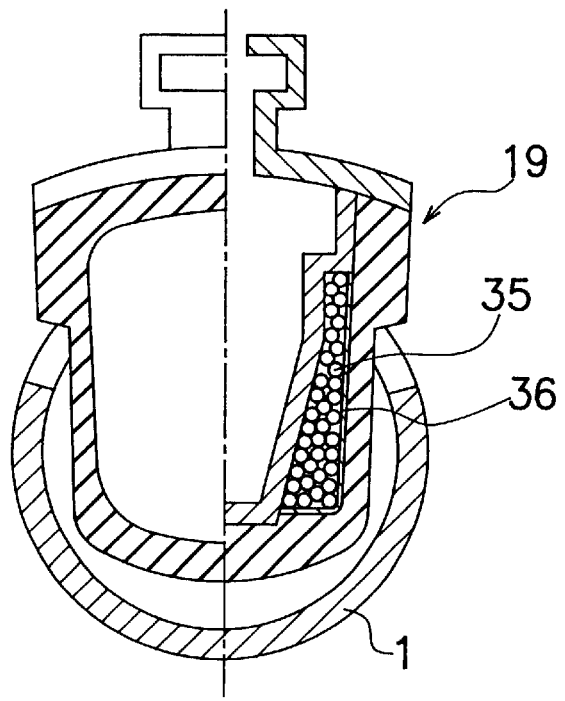
FIG. 10 is a cross sectional view illustrating the gate valve just before entering into the existing pipe.
Figure 11:
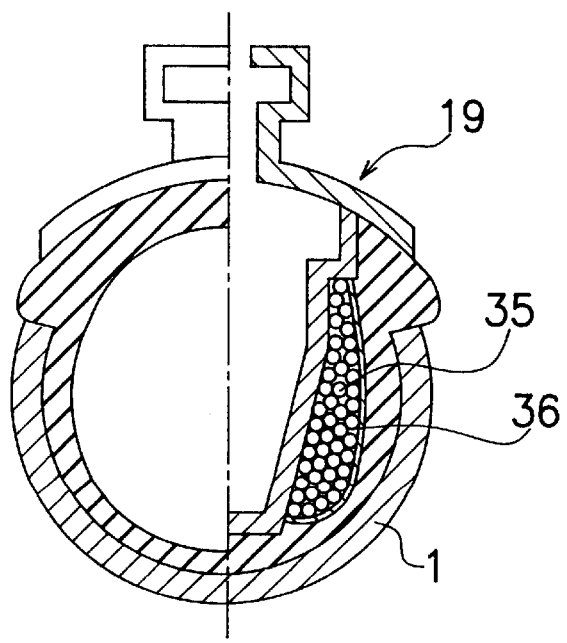
FIG. 11 is a cross sectional view illustrating the gate valve placed inside of the existing valve.

When the spindle 12 is rotated to lower the gate valve 19, the pressing portions 33 of the support member 18 downwardly press the hardballs 35, while the slanting portions 25a downwardly slantingly press the same. The hardballs 35 thus pressed in turn press the inner seal extension 20b laterally outwardly, as well as slightly downwardly via the flat springs 36 towards the inner surface of the pipe 1, thereby allowing the inner seal extension 20b to expand laterally outwardly and press against the inner surface of the pipe 1, as sliding along the clamping walls 29 (see FIGS. 10 and 11).

When the gate valve 19 is to be opened, the seal member 20 moves upward via the rotation of the spindle 12, and the inner seal extension 20b regain its original shape via its self-restoring force. Therefore, the gate valve system 8 can be easily returned to its original shape. In this embodiment, the hardballs 35 may also be disposed in a dotted area (C) of FIG. 8.

Figure 12:
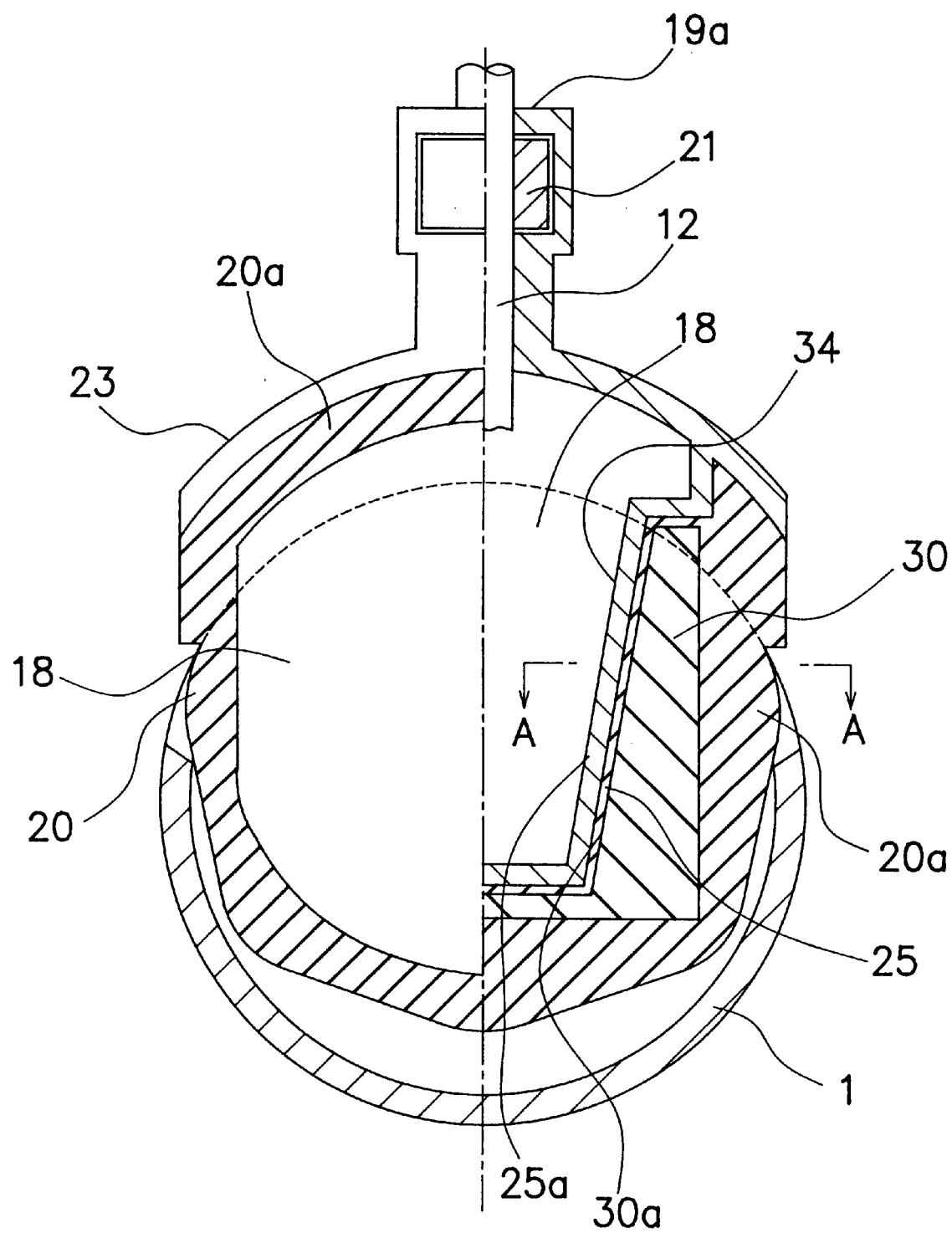
FIG. 12 is a partially cross sectional view of a gate valve in accordance with a third embodiment of the present invention.
Figure 13:
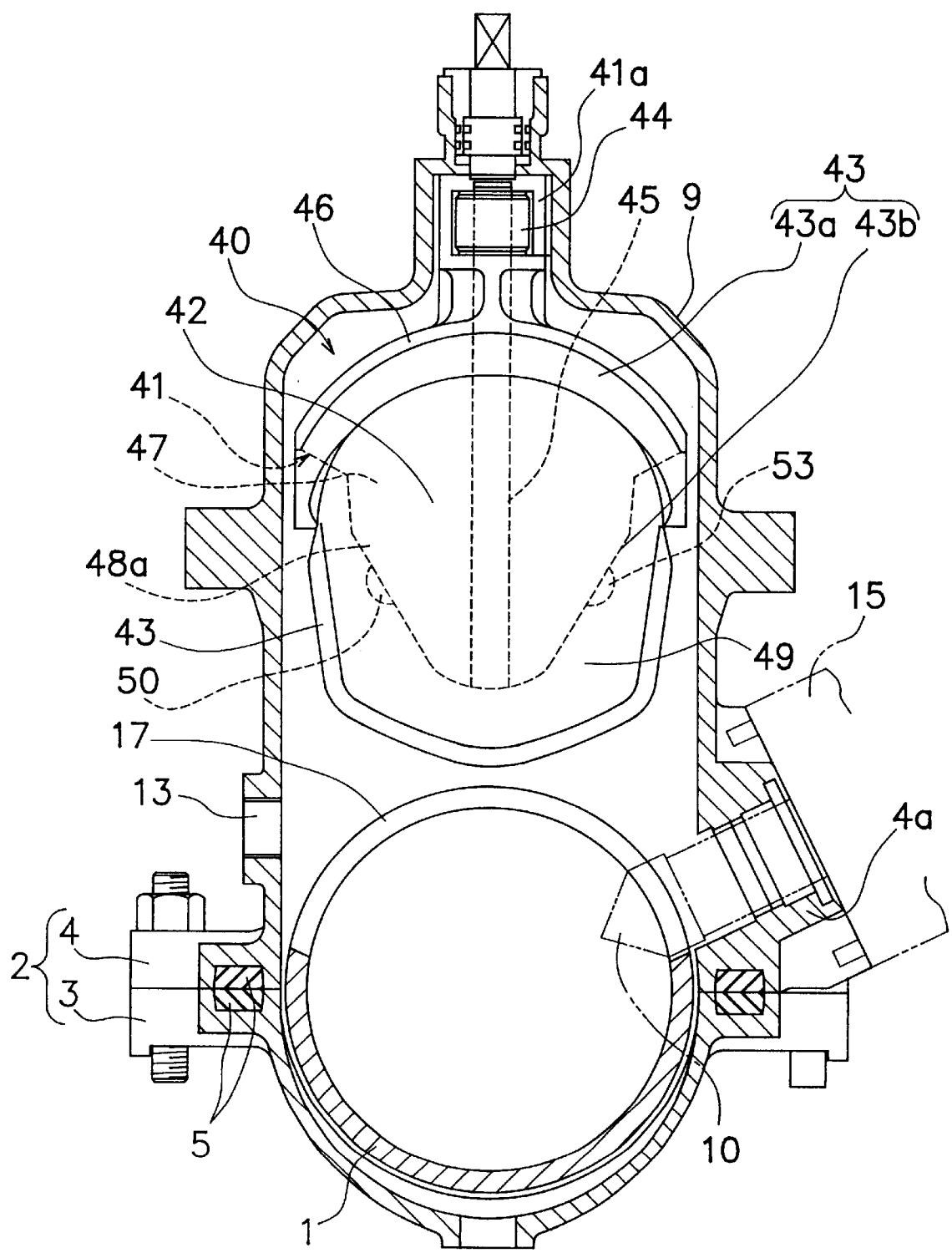
FIG. 13 is a cross sectional front view illustrating a gate valve system in accordance with a fourth embodiment of the present invention.
Figure 14:
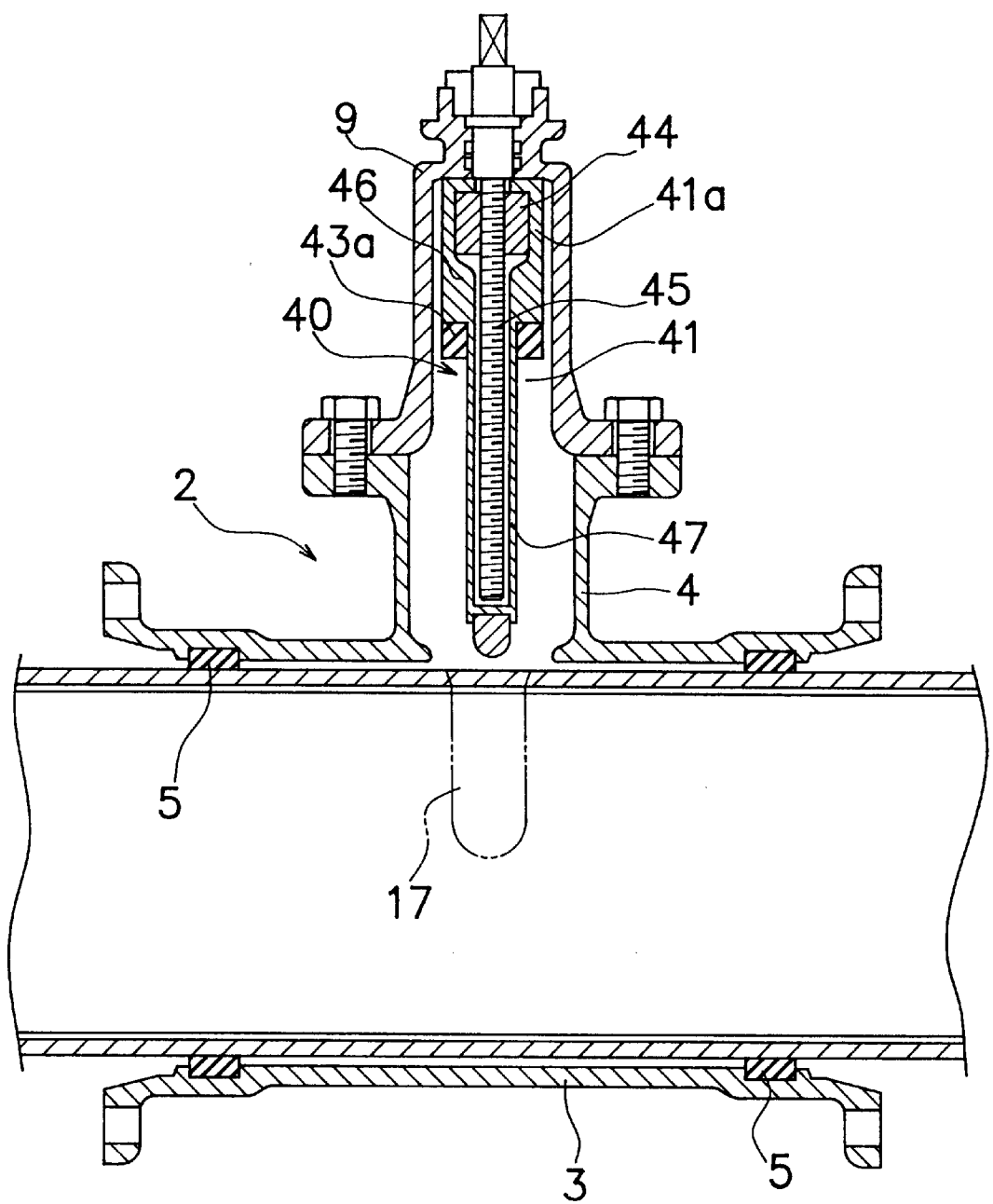
FIG. 14 is a cross sectional side view of the gate valve system of FIG. 13.
Figure 15:
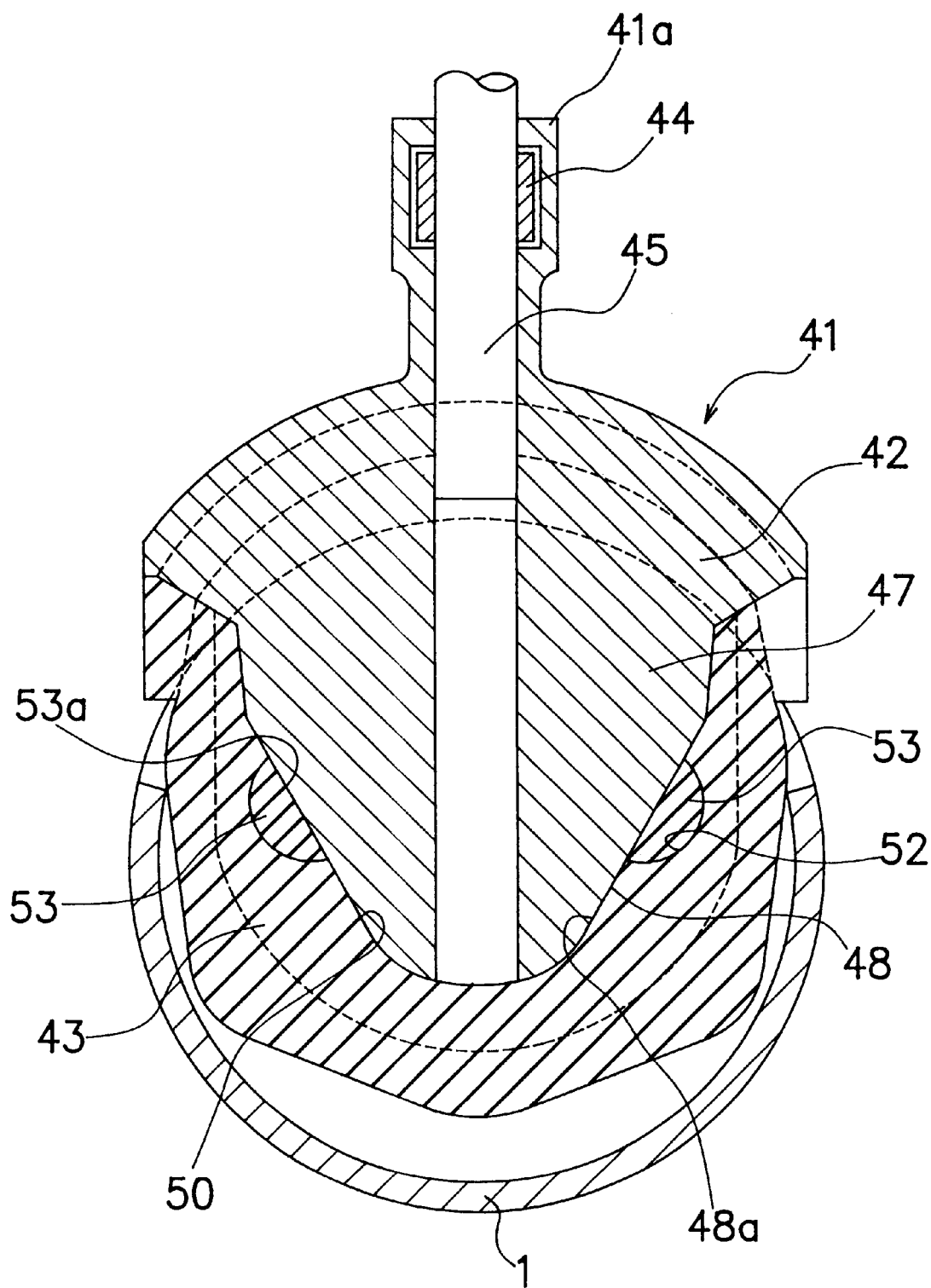
FIG. 15 is a cross sectional view illustrating the gate valve just before entering into the existing pipe.
Figure 16:
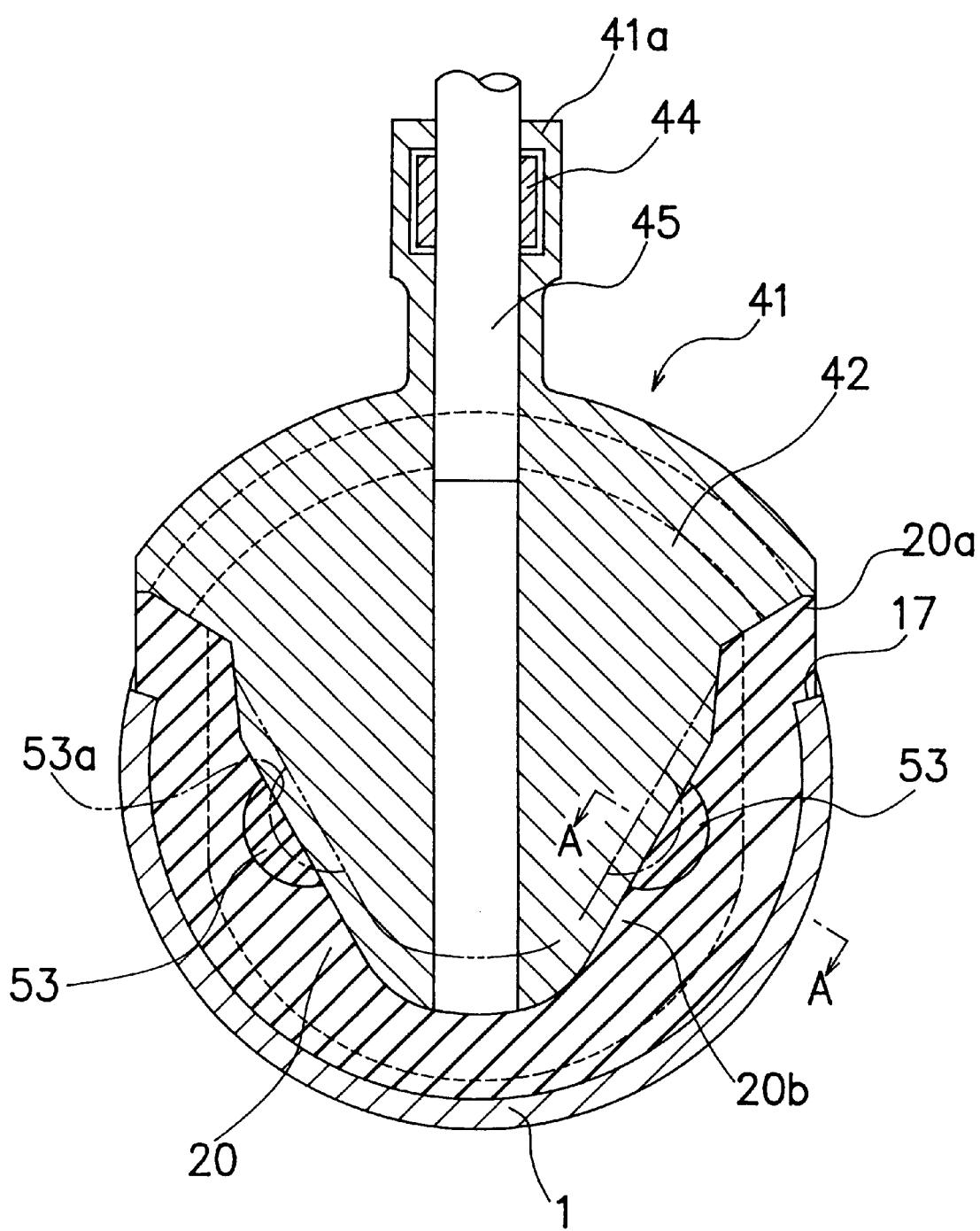
FIG. 16 is a cross sectional view illustrating the gate valve placed inside of the existing valve.
Figure 17:
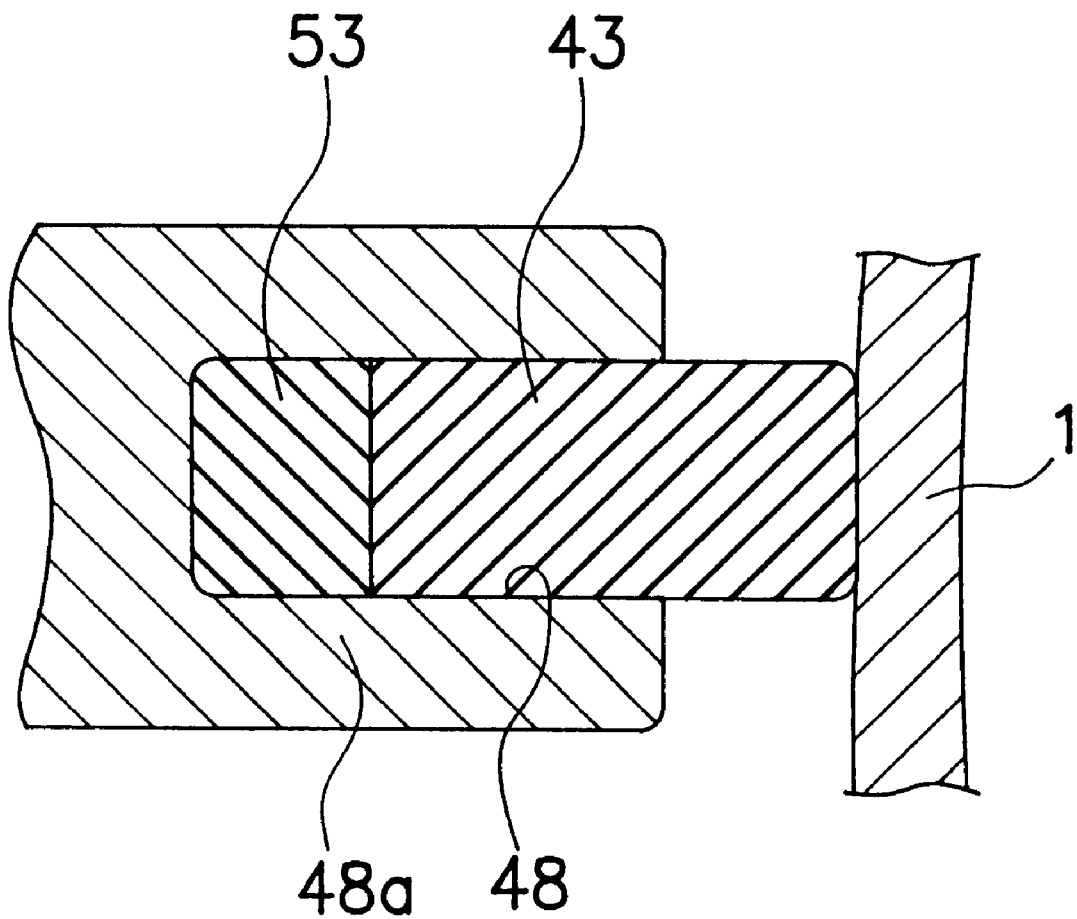
FIG. 17 is a cross sectional view of the gate valve taken along a line A—A in FIG. 16.
Figure 18:
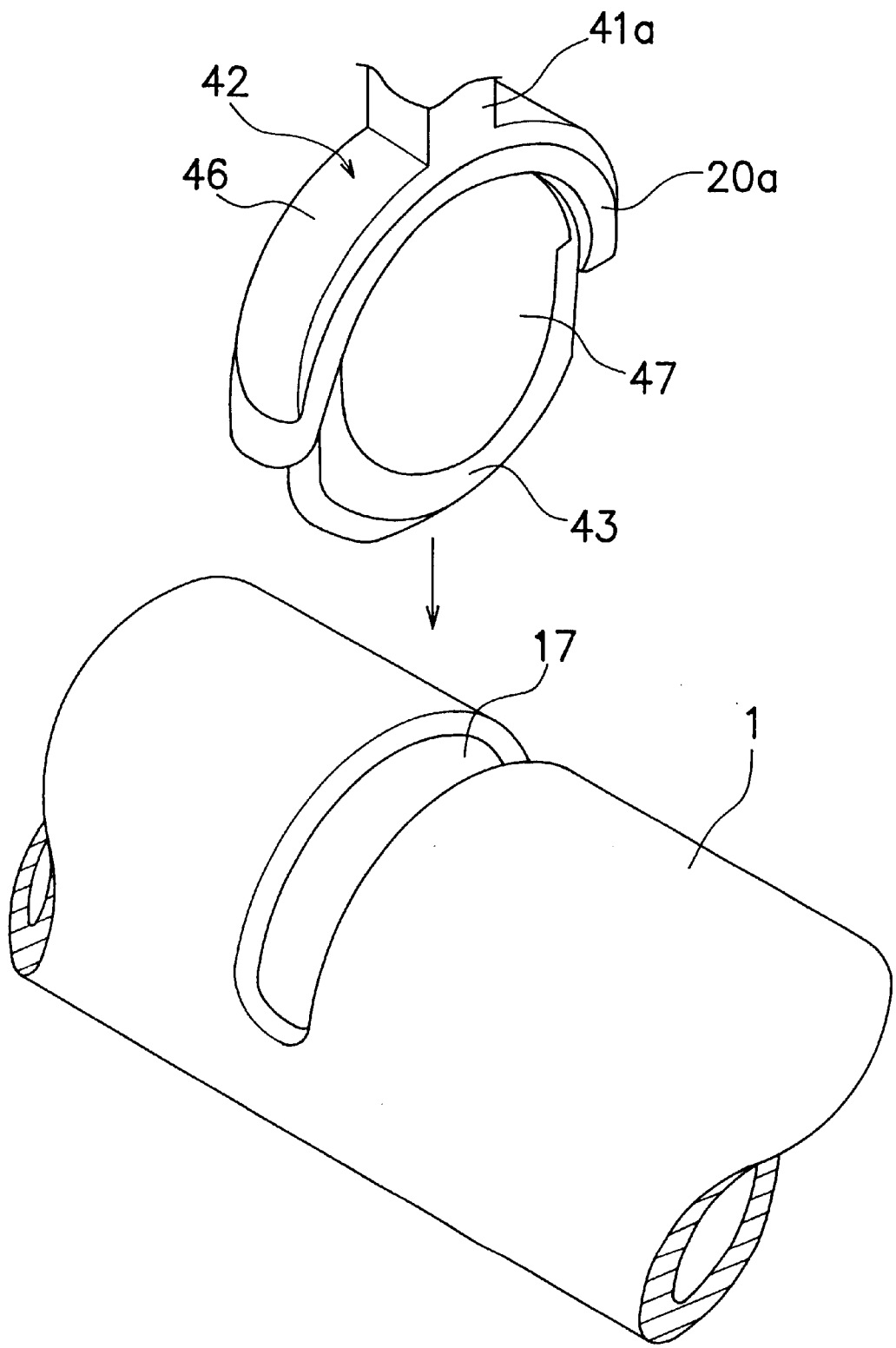
FIG. 18 is a perspective view illustrating the gate valve and the existing pipe.
Figure 19:
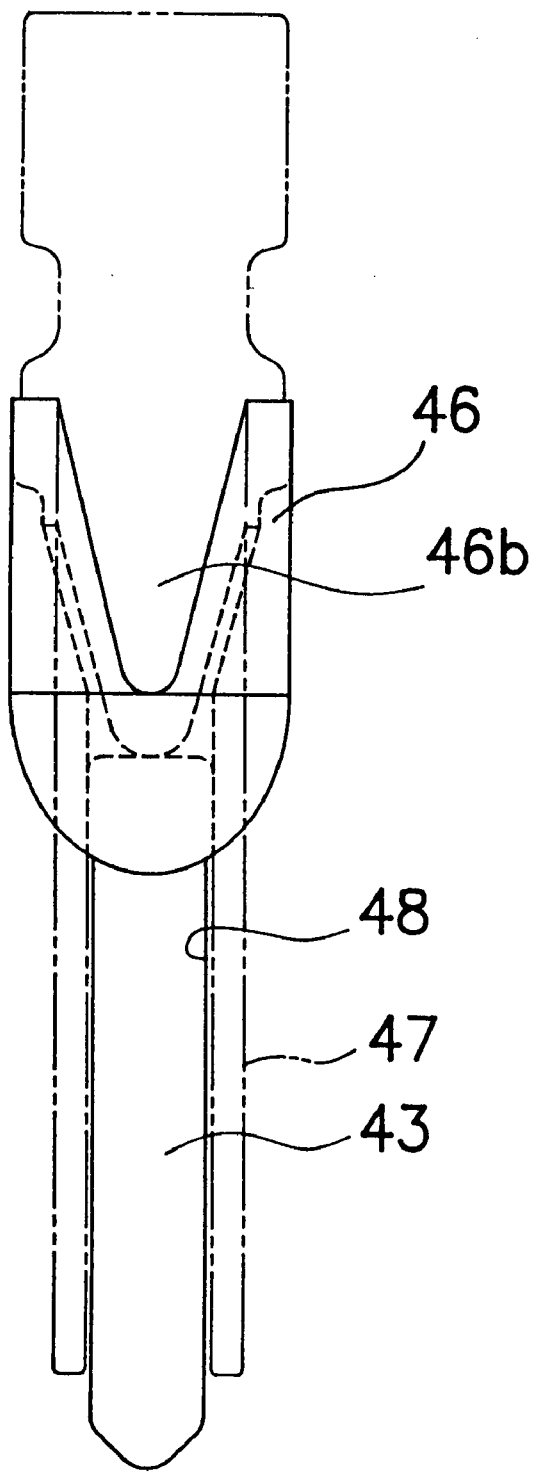
FIG. 19 is a side view of a seal member.

FIG. 12 illustrates a third embodiment of the present invention, in which corresponding or identical parts to those of the aforesaid embodiments have been given the same reference characters to omit a detailed description thereof. The supporting portions 34 of the groove bottom 31 respectively form the slanting portions 25a which inwardly downwardly slant to form the retaining member 24 of a tapered shape. The expansion members 30 are made of, for example, a rubber material and a plastic material, those of which are softer than the seal member 20 in such a manner as to be deformable upon receiving pressure, but are not substantially subjected to the volume variation even under pressure. The expansion members 30 thus made are disposed along the entire length of the fitting groove 25 of the retaining member 24. In this arrangement, the inner seal extension 20b is forcibly expanded laterally outwardly, as well as slightly downwardly to the inner surface of the pipe. The retaining member 24 of the tapered shape according to this embodiment more effectively or precisely direct the seal member 20 towards the inner surface of the pipe, particularly towards the lateral portions of the inner surface of the pipe which are hardly sealed according to the conventional manner.

FIGS. 13 to 19 illustrate a fourth embodiment of the present invention, in which corresponding or identical parts to those of the aforesaid embodiments have been given the same reference characters to omit a detailed description thereof. Accordingly, the differences between this embodiment and the aforesaid embodiments will be mainly discussed hereinbelow.

A gate valve system 40 is positioned to a set position, i.e. the position above an object portion of the pipe 1 which corresponds to the cut out 17 to be cut by the cutter portion 10 of the cutting device 15. The gate valve system 40 includes a gate valve 41, which in turn includes a support member 42 made of metal or other hard materials and provided at an upper portion thereof with a nut receiving portion 41a, and a seal member 43 made of a rubber material exhibiting the elastically deformable property. A spindle 45 has an outwardly threaded portion thereon, a first end portion threadably engaged with a nut 44 received in the nut receiving portion 41a for being rotatably supported within the sealing case 2, and a second end portion coupled to a seal member 43 which will be described hereinafter. The rotation of the spindle 45 by the rotational force of the driving mechanism allows the support member 42 to vertically move within the sealing case 2.

The support member 18 includes a flange portion 46 having an arcuate shape as viewed from the front side and a retaining member 47 extending downwardly from the flange portion 46. The retaining member 47 has a peripheral edge forming a fitting groove 48 having a U-shaped cross section, which receives a seal member 43. The seal member 43 has an outer seal extension 43a and an inner seal extension 43b whose peripheral edge is fitted into the fitting groove 48. More specifically, a pair of clamping walls 49 extend from the retaining member 47 to form the fitting groove 48. The retaining member 47 is of a tapered shape with slanting portions 48a positioned at a peripheral edge portion thereof.

The outer seal extension 43a of the seal member 43 defines an opening 46b extending along a longitudinal axis thereof for allowing the retaining member 47 of the gate valve 41 to pass therethrough from above, and receive the inner periphery of the inner seal extension 43b via the fitting groove 48. The inner periphery of the inner seal extension 43b defines a contact surface (slant contact surface) 50 which corresponds in shape to the fitting groove 48.

The contact surface 50 of the inner seal extension 43b has the lateral sides thereof defining recesses 52 having a substantially semi-circular shape, into which expansion members 53 made of iron or other hard materials which are hardly deformed by pressures are respectively fitted. A surface 53a exposed from the inner seal extension 43b is substantially flush with the contact surface 50 of the inner seal extension 43, which is adapted to contact the retaining member 47.

The operational steps of the gate valve system of this embodiment will be now described.

An operator first installs the sealing case 2 on the existing pipe 1 with the water flowing therethrough by hermetically coupling the first and second halves 3, 4 via the fastening member such as a bolt and nut. The sealing case 2 is then rotated around the axis of the existing pipe 1 to bring the cutter portion 10 of the cutting device 15 to the starting point from which the cutter portion 10 cuts the wall of the existing pipe 1. The cutter portion 10 is then actuated and radially inwardly moved towards the pipe to cut the wall from the starting point. The sealing case 2 is then rotated around the axis of the existing pipe 1 by approximately 150 to 160 degrees, so that the cutter portion 10 cuts the wall of the pipe 1 from the start point to the terminal point to form the cut out 17 in an upper portion of the wall of the pipe 1. The chips as a result of cutting the wall are discharged from the outlet port 13 together with the water.

The outlet port 13 is closed with a plug (not shown) after forming the cut out 17. The cutter portion 10 is then retracted from the existing pipe 1 and the closing valve (ball valve) is closed. Subsequent to closing the outlet port 13, the cutting device 5 is removed from the sealing case 2. The sealing case 2 is then rotated to an original position so as to locate the gate valve 41 above the cut out 17.

The gate valve 41 is then lowered and moved into the inside of the existing pipe through the cut out 17 by rotating the spindle 45 in a threaded engagement with the nut 44, thereby bringing the inner seal extension 43b into a contact engagement with the inner surface of the pipe. The inner seal extension 43b lying on the inner surface of the bottom portion of the pipe 1 is further pressed against the inner surface via the downward movement of the gate valve 41. This pressure causes the slanting portions 48a of the retaining member 47 to slide along the contact surface 50 of the expansion members 53, and then forcibly press the expansion members 53 laterally outwardly, as well as slightly downwardly towards the inner surface of the pipe 1 against the elastic force of the seal member 20.

As a result, the inner seal extension 43b is expanded laterally outwardly to the inner surface of the pipe 1 against the elastic force of the seal member 20, so that the inner seal extension 43b presses against the inner surface of the pipe throughout the peripheral edge of the inner seal extension 43b. Thus, a hermetic sealing of the existing pipe 1 can be accomplished.

When the gate valve 41 is to be opened, the spindle 45 is reversely rotated to upwardly move the seal member 20. The seal member 20 then regains its original shape after removing from the contacting surface of the pipe.

It is to be noted that the slanting angle of each slanting portion 48a and the position of each expansion member 53 can be suitably determined according to each case. Preferably, they are determined so as to provide the maximum expansion of the inner seal extension 43b.

Figure 20:
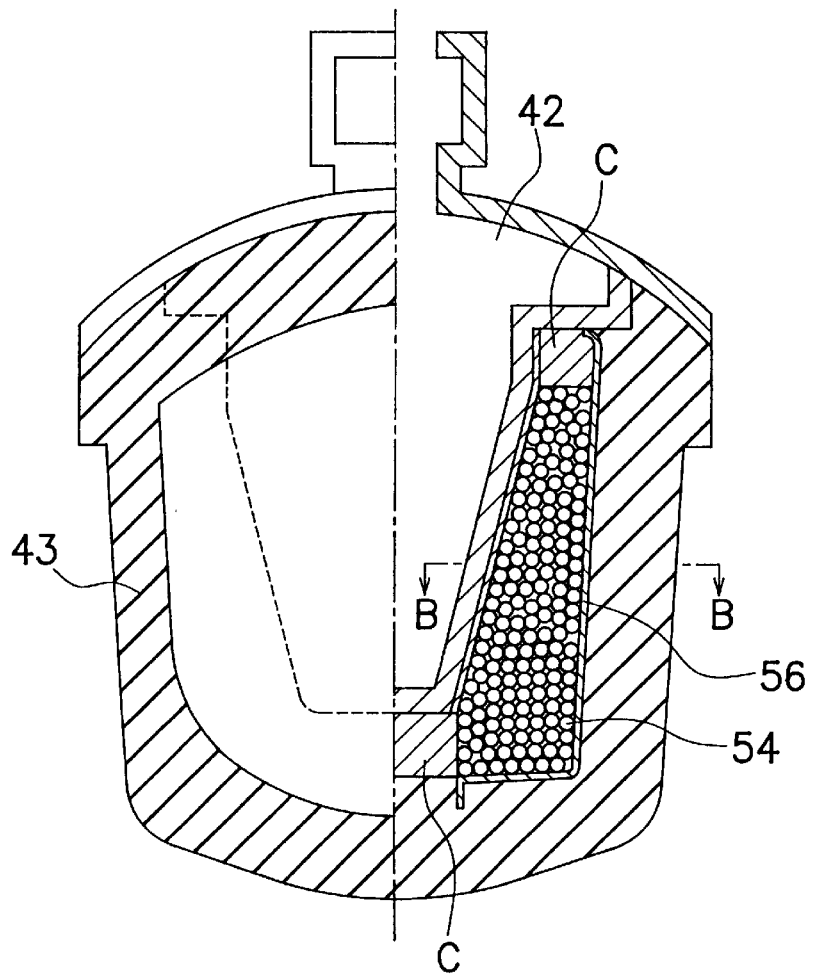
FIG. 20 is a partially cross sectional view of a gate valve in accordance with another embodiment of the present invention.
Figure 21:
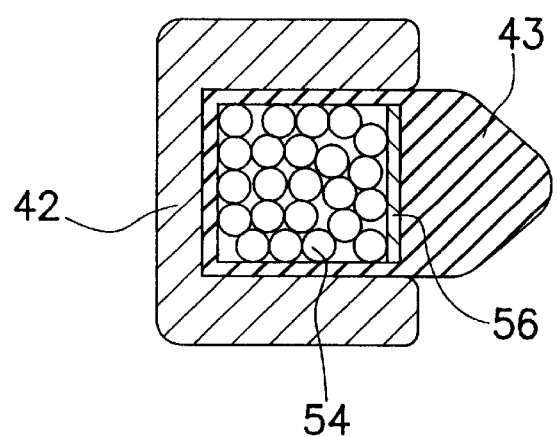
FIG. 21 is a cross sectional view of the gate valve taken along a line B—B in FIG. 20.
Figure 22:
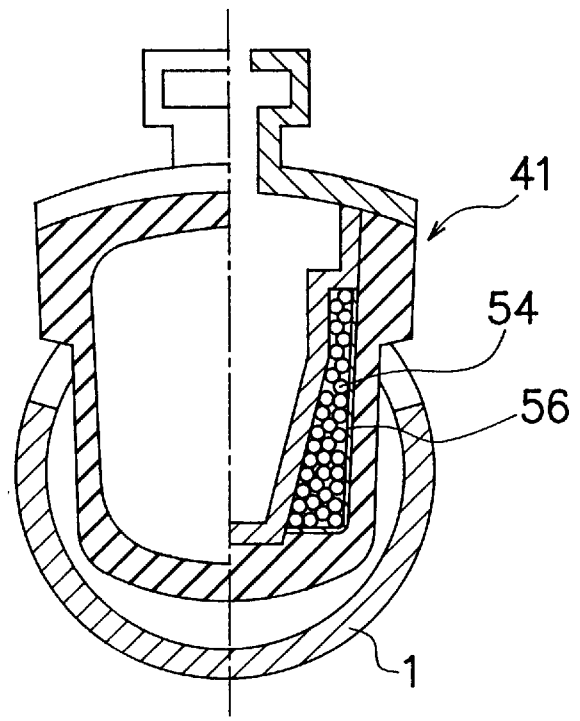
FIG. 22 is a cross sectional view illustrating the gate valve just before entering into the existing pipe.
Figure 23:
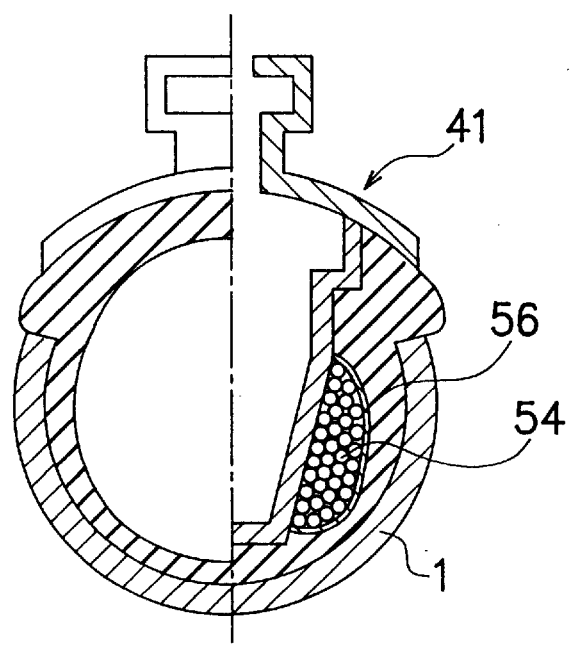
FIG. 23 is a cross sectional view illustrating the gate valve placed inside of the existing valve.
Figure 24:
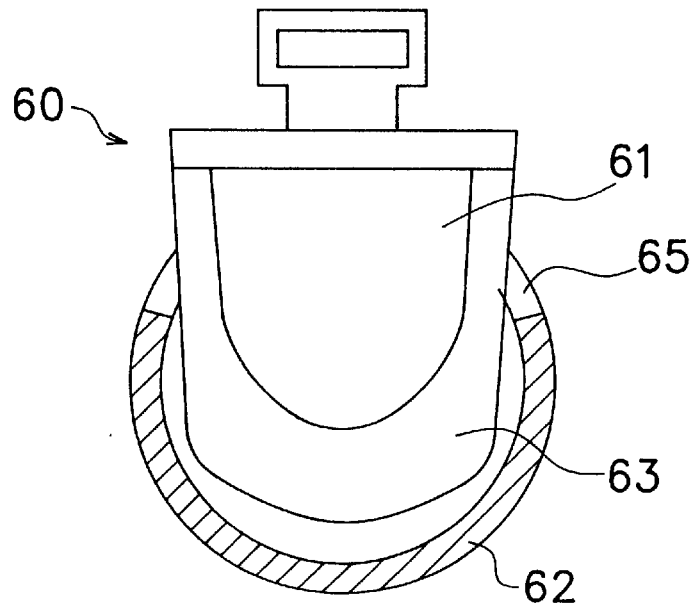
FIG. 24 is a cross sectional view illustrating a gate valve of a conventional type just in an unsealing position.
Figure 25:
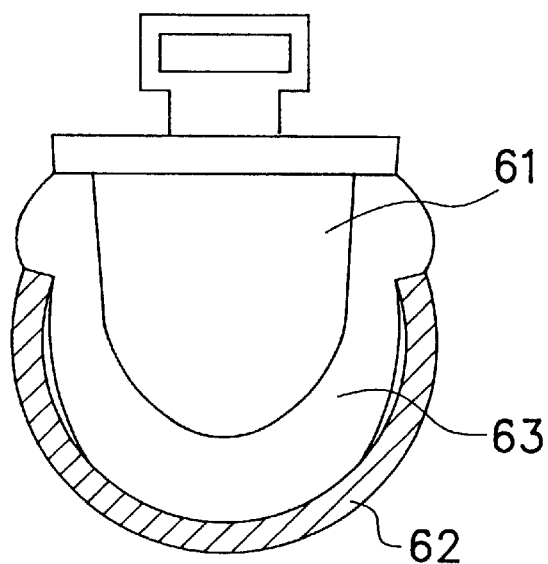
FIG. 25 is a cross sectional view illustrating the gate valve of the conventional type in a sealing position.

FIGS. 20 and 21 illustrate a fifth embodiment of the present invention, in which the expansion members each includes balls (hardballs) 54 disposed around both lateral sides of the seal member 43 and a flat spring 56 surrounding the hardballs 54 in cooperation with the seal member 43. The thus made expansion members are embedded in the seal member 43. The seal member 43 is of a tapered shape with slanting portions formed in the lateral sides of the seal member 43. When the gate valve is lowered to be closed, the sliding engagement between the slanting surfaces of the seal member 43 and the support member 42 occurs, which causes the hardballs 54 to push the flat spring 56 outwardly towards the inner surface of the pipe. The thus pushed flat springs 56 are bent outwardly, thereby expanding the seal member 43 outwardly towards the inner surface of the pipe (see FIGS. 22 and 23).

When the gate valve is opened, the seal member 43 moves upward to regain its original shape via its self-restoring force. During this shape restoring process, the hardballs 54 are returned to their original positions or area via the spring force of the flat springs 56, so that the expansion members are unlikely to be obstacles for shape regaining of the seal member. In this arrangement, the hardballs 54 may also be disposed in a dotted area (C) of FIG. 20.

It is not necessary to limit the present invention to the aforesaid embodiments. Specifically, the gate valve system of the present invention is not limited to the application described in the aforesaid embodiments, i.e. the application of the gate valve system to the pipe with water flowing therethrough. It is to be noted that the gate valve system of the present invention is effective to cut off any fluids other than water flowing through the pipe.

In addition, the expansion members which are respectively disposed in the lateral sides of the inner seal member. However, a single expansion member can be employed, provided that it has a shape enabling the expansion member can be disposed both lateral sides of the inner seal member. Furthermore, more than two expansion members can be employed.

This specification is by no means intended to restrict the present invention to the preferred embodiments set forth therein. Various modifications to the gate valve system, as described herein, may be made by those skilled in the art without departing from the spirit and scope of the present invention as defined in the appended claims.

What is claimed is:

1. A gate valve system for cutting off a fluid flowing through a pipe, which comprises:
   a gate valve including a seal member exhibiting an elastically deformable property for sealingly contacting the inner surface of the pipe, and a support member for receiving said seal member and movable in the perpendicular direction to the flowing direction of the fluid between the outside and inside of the pipe for timely bringing said seal member into a sealing contact with the inner surface of the pipe; and at least one expansion member being deformable, but not substantially subjected to the volume variation even under pressure, said expansion members being embedded in said seal member in such a manner as to expand the seal member laterally outwardly to the inner surface of the pipe upon receiving pressure effected by the sealing contact between the seal member and the inner surface of the pipe; and wherein said at least one expansion member includes balls.

2. A gate valve system for cutting off a fluid flowing through a pipe, which comprises:

a gate valve including a seal member exhibiting an elastically deformable property for sealingly contacting the inner surface of the pipe, and a support member for receiving said seal member and movable in the perpendicular direction to the flowing direction of the fluid between the outside and inside of the pipe for timely bringing said seal member into a sealing contact with the inner surface of the pipe, said support member being of a tapered shape with slanting portions with a lower end of the support member being narrower than the residual portions of the support member, and said seal member having a contact surface slidingly contacting said slanting portions of said support member; and expansion members being deformable, but not substantially subjected to the volume variation even under pressure, said expansion members being embedded in said seal member and respectively disposed along said slanting portions of the support member in such a manner as to expand the seal member laterally outwardly to the inner surface of the pipe via the sliding contact between the contact surface of the seal member and the slanting portions of the support member upon receiving pressure effected by the sealing contact between the seal member and the slanting portions of the inner surface of the pipe; and wherein said at least one expansion member includes balls.

3. The gate valve system according to claim 2, wherein said at least one expansion member further includes a flat spring laterally outwardly disposed with respect to said balls.

4. A gate valve system for cutting off a fluid flowing through a pipe, which comprises:

a gate valve including a seal member exhibiting an elastically deformable property for sealingly contacting the inner surface of the pipe, and a support member for receiving said seal member and movable in the perpendicular direction to the flowing direction of the fluid between the outside and inside of the pipe for timely bringing said seal member into a sealing contact with the inner surface of the pipe, said support member being of a tapered shape with slanting portions with a lower end of the support member being narrower than the residual portions of the support member, and said seal member having a contact surface for slidingly contacting said slanting portions of said support member; and a plurality of balls being harder than said seal member and embedded in said seal member;

a flat spring embedded in said seal member in a laterally outward portion with respect to said plurality of balls; and wherein said plurality of balls and said flat spring respectively disposed along said slanting portions of the support member so that said plurality of balls are pressed to laterally outwardly bend said flat spring, thereby expanding the seal member laterally outwardly to the inner surface of the pipe via the sliding contact between the contact surface of the seal member and the slanting portions of the support member upon receiving pressure effected by the sealing contact between the seal member and the slanting portions of the inner surface of the pipe.

* * * * *